United States Patent
Wu

(10) Patent No.: US 7,926,989 B2
(45) Date of Patent: Apr. 19, 2011

(54) STREET LAMP WITH DIRECTION INDICATOR

(75) Inventor: Chia-Ying Wu, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 135 days.

(21) Appl. No.: 12/344,652

(22) Filed: Dec. 29, 2008

(65) Prior Publication Data
US 2009/0290357 A1 Nov. 26, 2009

(30) Foreign Application Priority Data
May 20, 2008 (CN) .......................... 2008 1 0301668

(51) Int. Cl.
*F21S 8/00* (2006.01)
*F21S 13/10* (2006.01)

(52) U.S. Cl. ...................................................... 362/431

(58) Field of Classification Search .................... 362/29, 362/311.01, 335, 431, 458
See application file for complete search history.

(56) References Cited

U.S. PATENT DOCUMENTS
1,819,310 A * 8/1931 Wilson ............................ 33/333
1,847,775 A * 3/1932 Manfre ........................... 40/557
* cited by examiner

*Primary Examiner* — Jason Moon Han
(74) *Attorney, Agent, or Firm* — Clifford O. Chi

(57) ABSTRACT

An exemplary street lamp for being stalled on the ground includes a light source, a light pervious member and a direction indicator. The light pervious member includes a light incident surface and an opposite light emitting surface for facing the ground. The light source is arranged opposite to the light incident surface. The direction indicator is arranged on the light pervious member for projecting the shadow thereof on the ground to indication a direction at the geographic location of the street lamp.

4 Claims, 5 Drawing Sheets

STREET LAMP WITH DIRECTION INDICATOR

BACKGROUND

1. Technical Field

The present disclosure relates to a light source module, and particularly to a street lamp capable of indicating a direction at the geographic location thereof.

2. Discussion of Related Art

With developments in technology, light source modules are providing more varied applications with more convenience provided for users.

Conventional means of orienteering, such as signs and guideposts, may be rendered difficult or impossible to use by power outages or bad weather conditions. Additionally, there is a consistent possibility that orientation may be needed in a location without such assistance.

Therefore, what is needed is a street lamp capable of overcoming the described limitations.

BRIEF DESCRIPTION OF THE DRAWINGS

Many aspects of the present street lamp can be better understood with reference to the following drawings. The components in the drawings are not necessarily to scale, the emphasis instead being placed upon clearly illustrating the principles of the present street lamp. Moreover, in the drawings, like reference numerals designate corresponding parts throughout the several views.

DETAILED DESCRIPTION OF EMBODIMENTS

Figure 1:
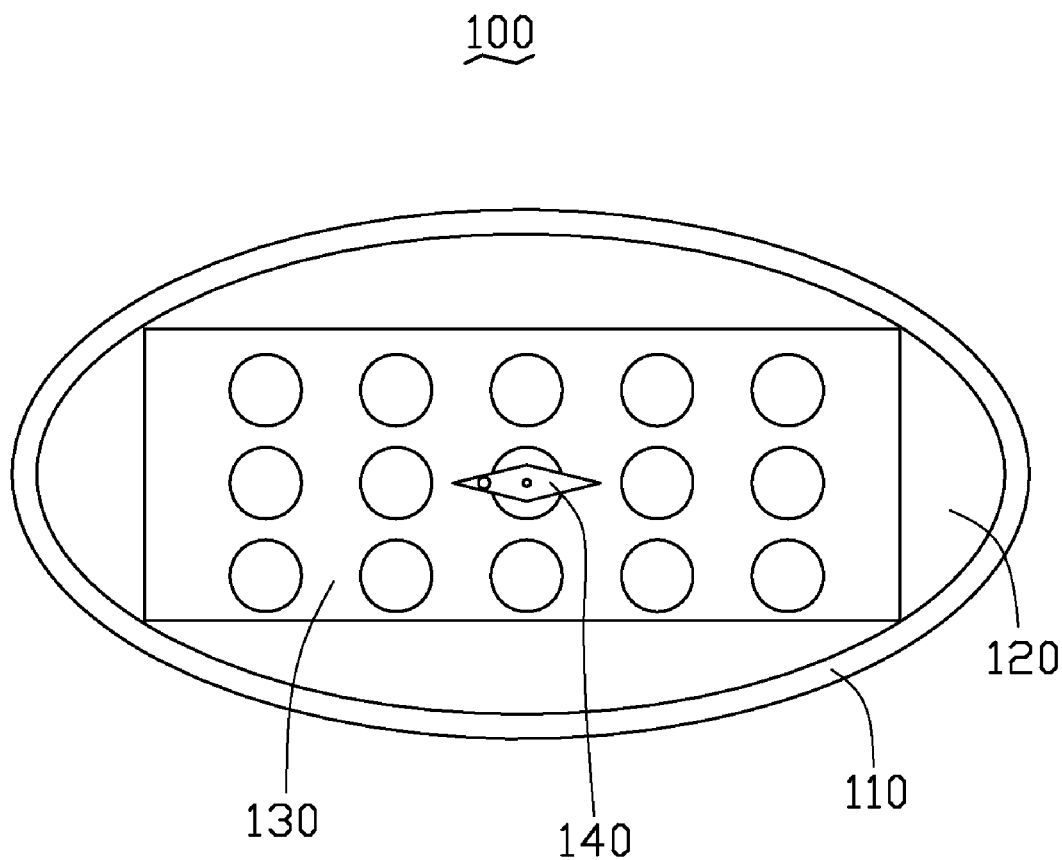
FIG. 1 is a schematic bottom view of a street lamp in accordance with a first embodiment.
Figure 2:
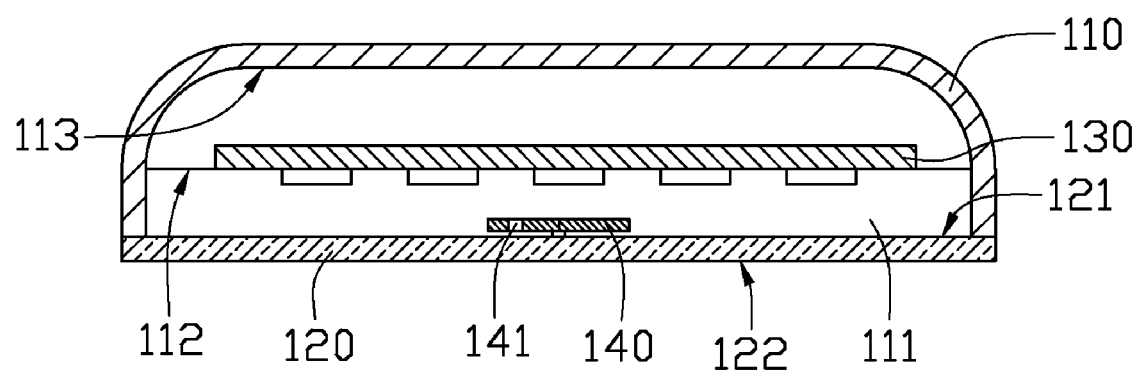
FIG. 2 is a schematic cross-section of the street lamp of FIG. 1.
Figure 3:
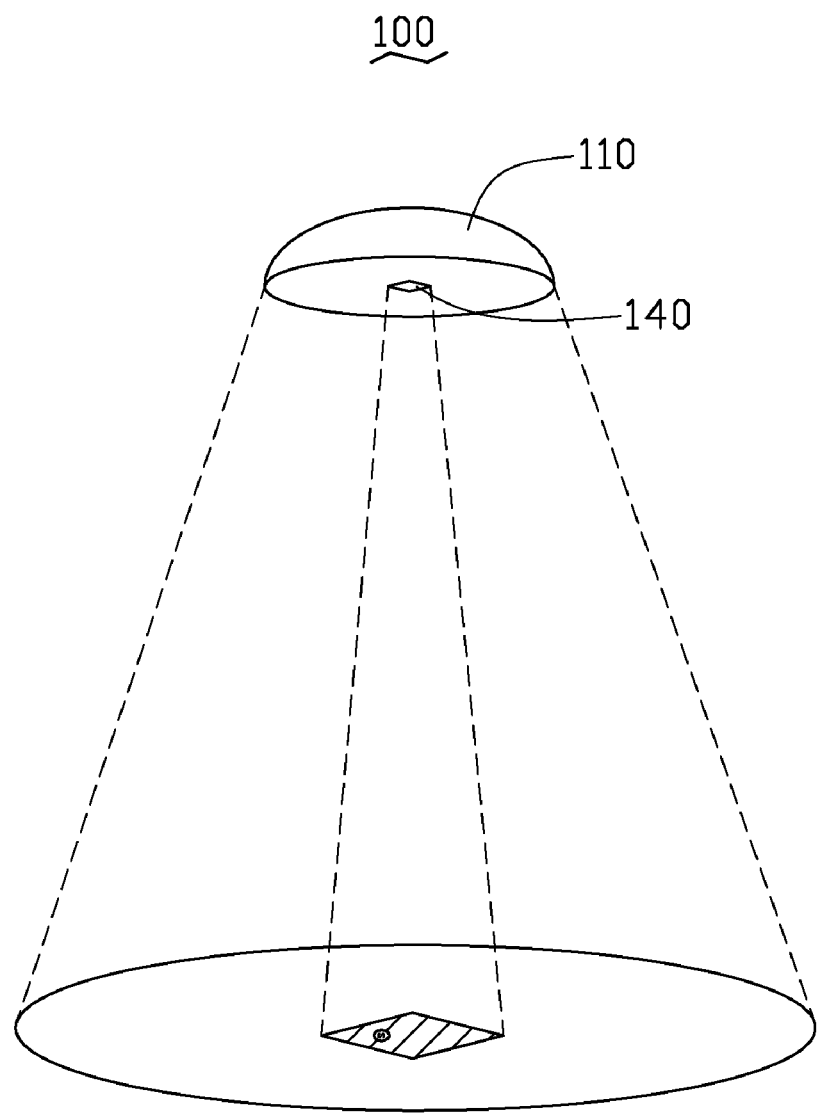
FIG. 3 is a schematic isometric view of the projection principle of the street lamp of FIG. 1.
Figure 4:
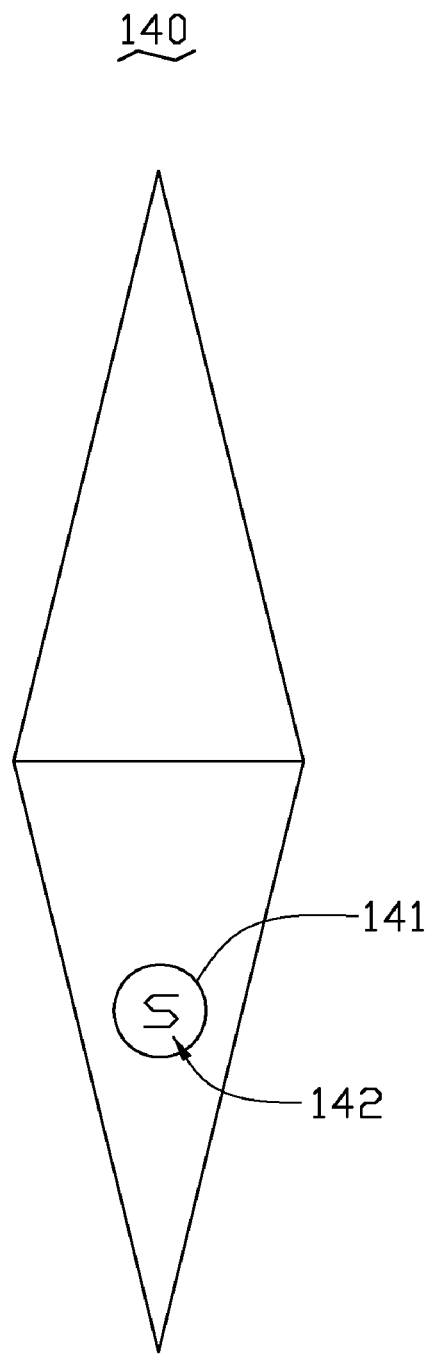
FIG. 4 is a schematic top view of the pivoting compass indicator in the street lamp of FIG. 1

Reference will now be made to the drawings to describe in detail of the exemplary embodiments of the street lamp.

Referring to FIGS. 1 to 4, a street lamp 100 for being installed on the ground, in accordance with a first embodiment, includes a cover 110, a light pervious member 120, a light source 130 and a pivoting compass indicator 140.

The cover 110 defines a cavity 111 for receiving the light source 130. The light pervious member 120 includes a light incident surface 121 and an opposite light emitting surface 122 for facing the ground. The light source 130 is arranged opposite to and facing the light incident surface 121. The light pervious member 120 may be a plate or a mask of light pervious materials, such as glass or plastic. The light source 130 is mounted in the cover 110 and supported by a supporting member 112. The supporting member 112 may be a plate, a shaft or other structure. Here, the supporting member 112 is a shaft fixed on the cover 110. Alternatively, the light source 130 may be mounted on the inner top surface 113 of the cover 110.

The pivoting compass indicator 140 is mounted on the light incident surface 121 of the light pervious member 120. The pivoting compass indicator 140 includes one end pointing to the northern cardinal direction and another end pointing to the southern cardinal direction. A symbol on at least one end of the indicator 140 represents the corresponding direction. In the present embodiment, the south end of the indicator 140 defines a through hole 141 receiving an "S" symbol 142.

Alternatively, an "N" symbol may be disposed on the north end of the indicator 140.

In use, when the street lamp 100 is turned on, the pivoting compass indicator 140 is illuminated by light emitted from the light source 130, thus forming a projected image of the pivoting compass indicator 140, including the directional symbol thereon. Accordingly, the compass direction is easily read by the user.

Figure 5:
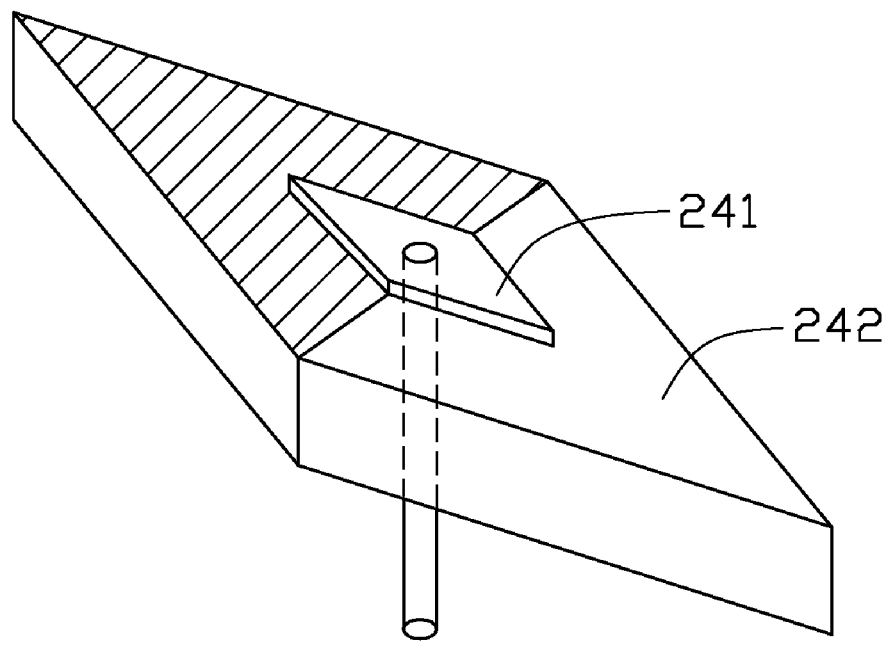
FIG. 5 is a schematic isometric view of the pivoting compass indicator in a street lamp in accordance with a second embodiment.

Referring to FIG. 5, a pivoting compass indicator 240 of a street lamp (not shown), in accordance with a second embodiment is shown, differing from the previous embodiment only in the inclusion of a double-color lens 242. The double-color lens 242 is arranged under the indicator 241 and is rotatable together therewith. The double-color lens 242 includes a first color lens portion and a second color lens portion, positionally corresponding to the north and south ends, respectively. The double-color lens 242, when projected with the image of the compass indicator 240, provides an even more easily recognized indication of the compass direction.

It should be understood that, in addition to the representative colors disclosed, the ends of the pivoting compass indicator 240 can additionally bear symbols indicating the appropriate compass direction, such symbols being applied to a surface of the double-color lens 242 beyond the indicator 241 and being light-impervious material. Thus, the symbols can cooperate with the projected colors to easily provide compass direction information. Alternatively, the due directions at the geographic location of the street lamp could be predetermined. A direction indicator, for example, a coating, could then be provided for projecting a shadow on the ground for indicating the directions at the geographic location of the street lamp. In doing so, the need for providing a pivoting compass indicator is obviated.

Additionally, it should be understood that a through hole defined on the double-color lens 242 corresponding to the first color lens portion or the second color lens portion can receive an appropriate symbol therein to distinguish the corresponding direction.

While the present disclosure has been described as having preferred or exemplary embodiments, the embodiments can be further modified within the spirit and scope of this disclosure. This application is therefore intended to cover any variations, uses, or adaptations of the embodiments using the general principles of the disclosure as claimed. Further, this application is intended to cover such departures from the present disclosure as come within known or customary practice in the art to which the disclosure pertains and which fall within the limits of the appended claims or equivalents thereof.

What is claimed is:

1. A street lamp for being installed on the ground, comprising:

a light source;

a light pervious member comprising a light incident surface, and an opposite light emitting surface for facing the ground, the light source being arranged opposite to the light incident surface; and a pivoting compass indicator arranged on the light pervious member for projecting a shadow thereof on the ground to indicate a direction at the geographic location of the street lamp, the pivoting compass indicator comprising a south end, an opposite north end, and a double-color lens arranged under the indicator rotatable together therewith, wherein the double-color lens comprises a first color lens portion and a second color lens portion, positionally corresponding to the north end and the south end respectively.

2. The street lamp of claim 1, wherein the first color lens portion spatially corresponding to the north end is red, and the second color lens portion spatially corresponding to the south end is white.

3. The street lamp of claim 1, wherein the pivoting compass indicator further comprises an "N" symbol disposed on the first color lens portion spatially corresponding to the north end.

4. The street lamp of claim 1, wherein the pivoting compass indicator further comprises an "S" symbol disposed on the second color lens portion spatially corresponding to the south end.

* * * * *